Patented Dec. 25, 1945

2,391,817

UNITED STATES PATENT OFFICE 2,391,817

RUBBERLIKE COPOLYMERS AND METHODS OF MAKING

Billee O. Blackburn, Kensington Park District, Calif., assignor to Shell Development Company, San Francisco, Calif., a corporation of Delaware No Drawing. Application November 2, 1942, Serial No. 464,288

8 Claims. (Cl. 260—84.5)

This invention relates to synthetic rubber-like masses and to methods for their production. It has as its principal object to utilize methylpentadienes in the production of co-polymers which may be easily worked up to yield finished rubber substitutes of superior strength, elasticity and workability.

Present day synthetic rubbers in the uncompounded state are somewhat stiffer than natural rubber and they consequently behave somewhat differently during processing on the usual rubber machinery. Thus, to obtain material which is suitable, it is necessary, as with Buna-S, to resort to oxidative pre-treatment or, as with Buna-N, to add large quantities of softeners and plasticizers. This quality of synthetic rubber is quite undesirable since it leads to increased costs and also may create certain inferior features in the final product.

It has now been found that synthetic rubbers of superior characteristics may be prepared from co-polymers produced by interpolymerizing 2-methyl-1,3-pentadiene and/or 4-methyl-1,3-pentadiene and a second aliphatic diene of conjugated double bond character with other co-polymerizable compounds.

The use of methylpentadienes in the manufacture of synthetic rubber is particularly attractive because of the ready availability of these hexadienes which are easily produced. According to one process acetone is first condensed to form diacetone alcohol which is then converted to 2-methyl-2,4-pentane diol by hydrogenation; dehydration of the 2-methyl-2,4-pentane diol giving the desired branched chain hexadienes. In the process of the present invention either one or both of the conjugated methylpentadienes named may be employed as a primary or starting material.

The second aliphatic conjugated diene of the co-polymers of the invention may be, for example, butadiene, isoprene, dimethyl butadiene, etc., while by the term "other co-polymerizable compounds" as used hereinabove is meant compounds such as styrene, α methyl styrene, acrylonitrile, methacrylonitrile, vinyl chloride, vinyl acetate, polyvinyl acetate, acrylates, as ethyl acrylate, methacrylates, methyl vinyl ketone, isobutylene, etc., together with their homologues, analogues, and suitable substitution products.

The mixed polymerization products obtainable according to the invention differ from other artificial rubber-like materials in that they are plastic and easily workable on rollers. Fillers such as zinc oxide, aluminum oxide, colloidal silicic acid, carbon black, etc., also vulcanizing agents as selenium and sulfur, vulcanization accelerators, dye stuffs, plasticizers as dibutyl phthalate and other agents used in the processing of rubber-like masses, are easily worked into these products by standard methods. When vulcanized in the presence of finely divided carbon, the co-polymers of the invention yield a vulcanizate of high technical value useful for a variety of purposes.

Interpolymerization of the methylpentadienes and a second or third conjugated aliphatic diene as the case may be (depending upon whether both or just one of the above named methylpentadienes is employed as a primary material) with one or more of the said other co-polymerizable compounds, for example, styrene and/or acrylonitrile is conveniently effected in aqueous emulsion. Emulsions of the participating monomers may be made by agitating them with water and a suitable emulsifying agent or an emulsoid colloid. In some instances the emulsification and interpolymerization may be carried out as a unit operation, the agitation necessary to produce the emulsion being supplied while maintaining the mixture at a polymerization temperature. Emulsifying agents which may be used include soaps, sodium oleate, stearic acids, etc., cetyl p-dimethylaminobenzoate, sodium lauryl sulfate, other salts derived from bases with long aliphatic chains and inorganic or organic acids, salts derived from high molecular weight organic acids and inorganic bases, etc. If desired emulsoid colloids as glue, albumen, blood fibrine, starch, and the like may be employed to facilitate the emulsification of the compounds to be co-polymerized. Such substances may be applied in lieu of or in combination with an emulsifying agent.

The interpolymerization reaction may proceed with the aid of a catalyst together with suitable promoters or regulators if preferred. Thus carbon tetrachloride and sodium perborate may be present in the mixture during the polymerization reaction. Other catalysts which may be used include: oxygen, ozone, hydrogen peroxide, organic peroxides and ozonides, persulfates, percarbonates, etc. Among compounds which may be preferred to carbon tetrachloride or which may be employed in addition thereto may be mentioned: other chlorinated aliphatic hydrocarbons as $C_2H_2Cl_4$, $C_2Cl_6$, and chlorinated aromatic hydrocarbons. Regulators of surface tension as amyl alcohol and other alcohols of five to eight carbon atoms, aldehydes, mercaptans, amines and the like, may also be present in the reaction mixture as may be hydrogen ion adjusters, or buffers as phosphates, carbonates, acetates, etc.

It is to be understood that instead of effecting the interpolymerization in aqueous emulsion, polymerization of the participating compounds may be brought about by simple heating and further, that the interpolymerization reaction may involve the use of a partially polymerized reactant or reactants as primary materials.

The interpolymerization as carried out in aqueous emulsion is usually conducted at a temperature in the neighborhood of from about 40° C. to about 65° C. but temperatures as high as 80° C. or as low as 20° C. can be employed. The time required for the interpolymerization varies depending upon the primary materials and their proportion in the treated mixture but is usually at least three to twenty hours. In general, it may be stated that the greater the proportion of methylpentadiene the slower will be the reaction. However, extension of the reaction period eventually results in complete polymerization to stable latices irrespective of the amount of methylpentadiene present.

The products of interpolymerization reaction are produced in latex-like form. A coagulum of excellent milling properties may be obtained by freezing and/or by treating the co-polymerization product with any suitable coagulating agent such as acetic acid, inorganic acids, ethyl alcohol, sodium hydroxide, aluminum sulfate, an alkali metal salt as sodium chloride, potassium chloride, an alkaline earth metal salt as calcium chloride, barium chloride, strontium chloride, etc. The choice of coagulant is of course largely determined by the emulsifying agent which has been It has been determined that rubber-like masses of a most desirable quality from the standpoint of milling properties and other considerations can be produced from a primary mixture consisting (by weight) of from about 5 to 30% methylpentadiene, 50 to 70% butadiene and about 10 to 25% acrylonitrile or styrene. These limits are not critical but may be widely varied depending upon the properties desired in the finished product. In some instances the quantity of methylpentadiene used may equal or exceed the quantity of butadiene employed. Also, as before indicated, other polymerizable compounds may be substituted for the butadiene and/or for the styrene or acrylonitrile.

The following examples illustrate the preparation of the co-polymers of the invention. From the examples and more particularly the tables forming a part thereof a comparison may be had between synthetic rubbers prepared according to the invention with methylpentadiene and two component rubbers prepared without hexadiene.

EXAMPLE I 55 parts of butadiene, 25 parts of styrene and 20 parts methylpentadiene were emulsified in 175 parts of a 5% Ivory soap solution having dissolved therein 1% of $Na_3PO_4 \cdot 12H_2O$ and 2.86%

$NaBO_3 \cdot 4H_2O$

To this emulsion was added 3 parts of carbon tetrachloride and 0.2 part of amyl alcohol. The emulsion was stirred 16 hours at 50° C. After coagulation (using acetic acid) a very plastic and easily workable polymer was obtained, the yield of which is given in Table I. This polymer and others prepared in a like manner by using different amounts of butadiene, styrene and methylpentadiene were compounded using a standard tire tread recipe with 50 parts of channel black and 5 parts of B. R. T. No. 7 softener per 100 parts of polymer. The vulcanizates obtained from these compounds were tested and a comparison of the physical properties of the vulcanizates with the optimum cures is given in Table I.

*Table I*

| Ref. No. | | Composition | | | Yield of polymer | Plasticity load[2] | | Tensile strength, number/sq. in. | Elongation, percent | Modulus, 300%, number/sq. in. | Rebound, percent | Abrasion, cc./h. p. hr. | Low temp. flex., °C. | Hardness |
|---|---|---|---|---|---|---|---|---|---|---|---|---|---|---|
| Polymer | Compound | B. D.[1] | S.[1] | M. P. D.[1] | | Crude | Compound | | | | | | | |
| P-160A | 3P-114 | 75 | 25 | 0 | 95 | 28.7 | 58.0 | 2,790 | 420 | 1,700 | 42 | 15 | −37 | 65 |
| P-153C | 3P-52 | 75 | 10 | 15 | 82 | 25.0 | 36.9 | 2,628 | 446 | 1,420 | 42 | 17 | −41 | 65 |
| P-153B | 3P-48 | 65 | 15 | 20 | 84 | 24.4 | 27.4 | 3,055 | 509 | 1,300 | 42 | 23 | −46 | 60 |
| P-160C | 3P-116 | 65 | 25 | 10 | 88 | 21.4 | 27.0 | 3,450 | 573 | 1,190 | 39 | 25 | −34 | 60 |
| P-159EFGH | 3P-122 | 55 | 25 | 20 | 83 | 13.5 | 11.0 | 3,880 | 668 | 1,000 | 35 | 39 | −30 | 55 |
| P-157D | 3P-72 | 55 | 15 | 30 | 75 | 21.1 | 14.1 | 3,664 | 689 | 910 | 39.5 | 38 | −37 | 55 |

[1] B. D.=butadiene. S.=styrne. M. P. D.=methylpentadiene.
[2] Plasticity load=load required to give 0.100" permanent deflection in 30 secs.

employed. Washing and drying of the coagulum may be accomplished on heated rollers in a roller mill equipped with a water spray or other such device. Where a soap has been employed as the emulsifying agent it may be considered desirable to wash also with a solution of sodium hydroxide, tri-sodium phosphate or other basic solution. The coagulated mass may be sheeted and further dried for example in a constant temperature cabinet prior to being further worked.

The dry materials may be vulcanized by compounding and heating, essentially by the same procedures as that employed with natural rubber. Standard rubber processing equipment can be used.

EXAMPLE II 60 parts of butadiene, 20 parts methylpentadiene and 20 parts acrylonitrile were emulsified in 250 parts of a 5% Ivory soap solution having dissolved therein 1% $Na_3PO_4 \cdot 12H_2O$ and 1.3% $K_2S_2O_8$. To this was added 3 parts hexachloroethane and 0.2 parts of amyl alcohol. The emulsion was stirred 16 hours at 40° C. After coagulation (using acetic acid) a very plastic polymer was obtained in good yields. This polymer and others prepared in a like manner using different amounts of butadiene, acrylonitrile, and methylpentadiene were compounded as above using a standard tire tread recipe with 50 parts of channel black and 25 parts dibutyl phthalate as softener per 100 parts of polymer. The vulcanizates obtained from these compounds were tested and comparison of the physical properties of the vulcanizates with the optimum cures is given in Table II.

*Table II*

| Ref. No. | | Composition | | | Plasticity load [2] | | Tensile strength, number/sq. in. | Elongation, percent | Modulus, 300%, number/sq. in. | Rebound, percent | Abrasion, cc./h. p. hr. | Low temp. flex., C. | Hardness |
|---|---|---|---|---|---|---|---|---|---|---|---|---|---|
| Polymer | Compound | B. D.[1] | A. C. N.[1] | M. P. D.[1] | Crude polymer | Compound | | | | | | | |
| P-117 | A. III-233 | 60 | 40 | 0 | 17 | 26 | 3,036 | 536 | 1,320 | 23 | 33 | −16 | 55 |
|  | A IV-93 | 60 | 20 | 20 | 12 | 6 | 3,100 | 750 | 560 | 35 | 84 | −27 | 51 |

[1] B. D.=butadiene. A. C. N.=acrylonitrile. M. P. D.=methylpentadiene.
[2] Plasticity load=load required to give 0.100" permanent deflection in 30 secs.

EXAMPLE III 55 parts of isoprene, 25 parts styrene and 20 parts of methylpentadiene were emulsified in 175 parts of a 5% Ivory soap solution containing 1% $Na_3PO_4 \cdot 12H_2O$ and 2.86% of $NaBO_3 \cdot 4H_2O$. To this was added 3 parts of hexachloroethane and 0.2 part of amyl alcohol. The emulsion was stirred for 16 hours at 50° C. After coagulation a 50% yield of polymer was obtained which gave a vulcanizate of very good properties.

I claim as my invention:

1. A process comprising polymerizing a mixture of from about 5% to about 30% of a methylpentadiene selected from the group consisting of 2-methyl-1,3-pentadiene and 4-methyl-1,3-pentadiene, from about 50% to about 70% of 1,3-butadiene and from about 10% to about 25% of styrene.

2. A process comprising polymerizing a mixture of from about 5% to about 30% of a methylpentadiene selected from the group consisting of 2-methyl-1,3-pentadiene and 4-methyl-1,3-pentadiene, from about 50% to about 70% of 1,3-butadiene and from about 10% to about 25% of acrylonitrile.

3. A process comprising polymerizing a mixture of from about 5% to about 30% of a methylpentadiene selected from the group consisting of 2-methyl-1,3-pentadiene and 4-methyl-1,3-pentadiene, from about 50% to about 70% of a different conjugated double bond diolefin, and from about 10% to about 25% of a compound of the group consisting of styrene, alpha methyl styrene, acrylonitrile and methacrylonitrile.

4. A copolymer of a mixture of from about 5% to about 30% of a methylpentadiene selected from the group consisting of 2-methyl-1,3-pentadiene and 4-methyl-1,3-pentadiene, from about 50% to about 70% of 1,3-butadiene and from about 10% to about 25% of styrene.

5. A copolymer of a mixture of from about 5% to about 30% of a methylpentadiene selected from the group consisting of 2-methyl-1,3-pentadiene and 4-methyl-1,3-pentadiene, from about 50% to about 70% of 1,3-butadiene and from about 10% to about 25% of acrylonitrile.

6. A copolymer of a mixture of from about 5% to about 30% of a methylpentadiene selected from the group consisting of 2-methyl-1,3-pentadiene and 4-methyl-1,3-pentadiene, from about 50% to about 70% of a different conjugated double bond diolefin, and from about 10% to about 25% of a compound of the group consisting of styrene, alpha methyl styrene, acrylonitrile and methacrylonitrile.

7. A process comprising reacting a mixture of from about 5% to about 30% of a methylpentadiene selected from the group consisting of 2-methyl-1,3-pentadiene and 4-methyl-1,3-pentadiene, from about 50% to 70% of isoprene, and from about 10% to about 25% of a compound of the group consisting of styrene, alpha methyl styrene, acrylonitrile and methacrylonitrile.

8. A copolymer of a mixture of from about 5% to about 30% of a methylpentadiene selected from the group consisting of 2-methyl-1,3-pentadiene and 4-methyl-1,3-pentadiene, from about 50% to 70% of isoprene, and from about 10% to about 25% of a compound of the group consisting of styrene, alpha methyl styrene, acrylonitrile and methacrylonitrile.

BILLEE O. BLACKBURN.